(12) United States Patent
Schug (10) Patent No.: US 6,260,114 B1
(45) Date of Patent: Jul. 10, 2001

(54) COMPUTER CACHE MEMORY WINDOWING

(75) Inventor: Klaus H. Schug, Fort Collins, CO (US)

(73) Assignee: MCMZ Technology Innovations, LLC, Silver Springs, MD (US)

(*) Notice: Subject to any disclaimer, the term of this patent is extended or adjusted under 35 U.S.C. 154(b) by 0 days.

(21) Appl. No.: 09/001,197

(22) Filed: Dec. 30, 1997

(51) Int. Cl.[7] .................................................. G06F 12/00
(52) U.S. Cl. ............................ 711/129; 711/119; 711/149
(58) Field of Search .................................... 711/118, 147, 711/149, 129, 119

(56) References Cited

U.S. PATENT DOCUMENTS

| | | | |
|---|---|---|---|
| 3,848,234 | 11/1974 | MacDonald | 340/172.5 |
| 4,473,881 | 9/1984 | Pilat et al. | 364/200 |
| 4,670,839 | 6/1987 | Pilat et al. | 364/200 |
| 4,905,141 | * 2/1990 | Brenza | 711/129 |
| 5,029,070 | * 7/1991 | McCarthy et al. | 711/143 |
| 5,056,002 | 10/1991 | Watanabe | 364/200 |
| 5,142,671 | 8/1992 | Ishida et al. | 395/425 |
| 5,434,992 | 7/1995 | Mattson | 395/425 |
| 5,435,000 | 7/1995 | Boothroyd et al. | 395/575 |
| 5,465,342 | 11/1995 | Walsh | 395/446 |
| 5,535,359 | 7/1996 | Hata et al. | 395/446 |
| 5,537,609 | 7/1996 | Whittaker et al. | 395/800 |
| 5,579,473 | 11/1996 | Schlapp et al. | 395/501 |
| 5,875,464 | * 2/1999 | Kirk | 711/129 |
| 5,915,099 | * 6/1999 | Takata et al. | 710/100 |

* cited by examiner

*Primary Examiner*—Do Hyun Yoo
*Assistant Examiner*—Nasser Moazzami
(74) *Attorney, Agent, or Firm*—Robert Abokhair & Mardula, LLC (57) ABSTRACT

A computer level 1 cache memory design with cache windowing divides a large level 1 cache into smaller sizes called windows, allowing the cache to provide more data faster to the CPU. Cache windowing provides the fast access times of a small level 1 cache through fewer, shorter paths and less circuitry than a large cache with multiple associative cache sets. Cache windowing allows context switching to occur with a simple change in cache window designation, eliminating the wait for cache reloading. Simulations of real cache implementations show an average of approximately 30% improvement in CPU throughput with cache windowing, scaling with CPU speed increases. The resulting system 1) maintains or improves CPU utilization rates as CPU speeds increase, 2) provides large level 1 caches while maintaining cache access times of one CPU clock cycle, and 3) provides high CPU utilization rates for those processing applications where locality of memory references is poor (e.g., networking applications).

30 Claims, 5 Drawing Sheets

| SUN UTRA SPARC1 CACHE CHARACTERISTICS | | | |
|---|---|---|---|
| | LEVEL 1 CACHE | | LEVEL 2 CACHE |
| | DATA CACHE | INSTRUCTION CACHE | |
| LOCATION | ON-CHIP | ON-CHIP | OFF-CHIP |
| SIZE | 16KB | 16KB | 1MB |
| READ POLICY | LOOK-THROUGH | LOOK-THROUGH | LOOK-THROUGH |
| WRITE POLICY | NON ALLOCATING WRITE-THROUGH | WRITE-THROUGH | WRITE-BACK |
| MEMORY MAPPING | DIRECT-MAPPED | 2-WAY SET ASSOCIATIVE | MULTI WAY SET-ASSOCIATIVE |
| LINE SIZE | 512 LINE; TWO 16 BYTE SUB-BLOCKS OF DATA PERLINE | 512 LINE; 32 BYTES PER LINE | 64 BYTE LINE |
| INDEXING | VIRTUAL | PHYSICAL | PHYSICAL |
| TAGGING | PHYSICAL | PHYSICAL | PHYSICAL |

FIGURE 4

|  | LEVEL 1 CACHE % OF TIME THAT A NETWORK APPLICATION IS RUNNING | | | | |
|---|---|---|---|---|---|
|  | 0 | 25 | 50 | 75 | 100 |
| % (I+D) rw MISSES<br>W/O CACHE WINDOWING<br>WITH CACHE WINDOWING<br>% IMPROVEMENT | 1.23<br>1.23<br>0 | 1.8401<br>1.288<br>30 | 2.5761<br>1.3543<br>47 | 2.5085<br>1.5<br>40 | 1.931<br>1.931<br>0 |
| % I READ MISSES<br>W/O CACHE WINDOWING<br>WITH CACHE WINDOWING<br>% IMPROVEMENT | 0.591<br>0.591<br>0 | 1.05<br>0.5832<br>45 | 1.611<br>0.5788<br>64 | 1.39<br>0.5556<br>60 | 0.481<br>0.481<br>0 |
| % D rw MISSES<br>W/O CACHE WINDOWING<br>WITH CACHE WINDOWING<br>% IMPROVEMENT | 3.34<br>3.34<br>0 | 4.508<br>3.6683<br>19 | 5.916<br>4.0415<br>32 | 6.617<br>4.9815<br>25 | 8.371<br>8.371<br>0 |
| % D READ MISSES<br>W/O CACHE WINDOWING<br>WITH CACHE WINDOWING<br>% IMPROVEMENT | 0.614<br>0.614<br>0 | 1.889<br>1.1075<br>41 | 3.317<br>1.6109<br>51 | 4.358<br>2.836<br>35 | 6.482<br>6.482<br>0 |
| % D WRITE MISSES<br>W/O CACHE WINDOWING<br>WITH CACHE WINDOWING<br>% IMPROVEMENT | 8.589<br>8.589<br>0 | 9.791<br>8.8372<br>10 | 11.421<br>9.1698<br>20 | 12.072<br>10.164<br>16 | 16.141<br>16.141<br>0 |

FIGURE 5

COMPUTER CACHE MEMORY WINDOWING

FIELD OF THE INVENTION

This invention relates generally to internal computer cache memory which includes central processing unit (CPU) on chip cache memory known as level 1 cache, the next memory in line between the CPU cache and main random access memory (RAM) known as level 2 cache, and any additional memory between level 2 and main memory, e.g., level 3 cache. More particularly, the present invention relates to improving cache performance through "cache windowing" to speed up the execution of networking and non networking applications on a computer.

BACKGROUND OF THE INVENTION

Processing capabilities of computers have been increasing dramatically over the last ten years. CPU's available in both personal computer and work station class computers commonly operate at 300 megahertz (MHz) and higher and are capable of executing 100 million instructions per second (MIPS). However, the realization of the full potential of these processors has been limited by the memory subsystem inside computers. The memory subsystem includes cache memories on the CPU chip known as level 1 cache and external CPU chip cache memories known as level 2 and level 3 cache. Random access memory (RAM) and primary storage (hard disk) round out a computer memory subsystem. The memory is unable to supply data and instructions to CPUs at a rate at which the CPU could consume data and instructions. CPUs are rarely busy more than 33% of the time and spend the vast majority of time idle waiting for memory to supply data and instructions. RAM has an access time of approximately 60 nanoseconds (ns). A modern reduced instruction set computer (RISC) CPU running at 250 MHz can execute up to four instructions involving many bytes of data in 4 ns, or 15 times the rate at which RAM can supply data and instructions. Without any other components, this CPU would typically be idle 56 out of every 60 ns, or 93.3% of the time. A number of techniques have been implemented to span the speed gap between RAM and the CPU in order to keep the CPU supplied with data and instructions at a higher rate than just RAM alone can provide. Cache memory is the main technique employed to bridge the speed gap. Cache memory relies on the principle of locality of reference in order to anticipate the data and instructions required by the CPU in the near future. The data and instructions required by the CPU in executing application programs tend to be located in adjacent memory locations. As the CPU executes instructions, consumes and generates data, the instructions and data tend to be read or written into adjacent memory locations. The next required memory access tends to be very near the last memory location accessed. This is the principle of locality. As a result, cache memory is used to fetch and hold not only the immediately required data and instructions, but also some amount of data and instructions near the locations required by the CPU at a given time. While the CPU is busy executing current instructions working on current data, cache memory is downloading instructions and data from RAM memory near those locations currently used by the CPU in anticipation of near term CPU data and instruction needs. Fetching data and instructions from RAM is overlapped with CPU execution of current instructions and data allowing the CPU to continue executing instead of waiting for slow RAM accesses to complete. Since cache memory can also only access RAM at the RAM speed of approximately 60 ns, in order to keep the memory pipeline near full with required data and instructions, several levels of cache memory are used. A level 2 cache is relatively large and loads large amounts of instructions from RAM into its memory. A level 1 cache is relatively small and loads smaller amounts of data and instructions into its memory from the level 2 cache. Each level of cache memory gets progressively smaller and faster in access time the further down in the memory pipeline from RAM. Level 2 caches are approximately 1 megabyte (MB) in size and have access times approximately two to three times faster than RAM, typically in the 20 ns range. A level 1 cache is relatively small since it must be located on the CPU chip, approximately 64 kilobytes (KB) in size, and has an access time typically equal to the CPU clock rate, in the range of 4 ns. If present, a level 3 cache would sit between level 2 and RAM, would hold 8 MB or more, and would have an access time near that of RAM, approximately 60 ns. The net result of this elaborate memory subsystem is to improve the CPU utilization from 6% without cache memories to approximately 33%.

Present cache memory subsystems do not solve three main problems associated with cache memories:
1. Maintaining or improving CPU utilization rates as CPU speeds increase;
2. Providing larger caches while maintaining cache access times of one CPU clock cycle, and
3. Providing high CPU utilization rates for those processing applications where locality of memory references is poor.

As CPU speeds continue to increase and memory speeds stay relatively constant as they have done for the last 10 years, the rate of CPU utilization continues to drop as the CPU spends more and more time waiting for cache memory to be filled with the required data and instructions. If the CPU utilization decreases with increasing CPU clock speed, the CPU performance advancements are negated. As CPU speed increases, in order to keep the CPU supplied with the required data and instructions to process, cache memory subsystem of a computer must supply data and instructions at a faster rate. There are only two ways to increase the rate of cache memory transfer, speed up the cache memory access times or increase the size of the cache memory. These two options are at odds with one another. Increasing the cache memory size, though feasible with reduced chip feature sizes, increases the access times at the square of the size. For those cases where locality of reference is not good, e.g., applications performing network data processing, the rate of CPU utilization drops significantly, below the 10% mark. A simple scaling of the present cache memory architecture is not a viable approach to improve or maintain present performance levels in an environment of faster and faster CPU speeds. Increasing the size of level 2 or higher level cache memories (or even increasing RAM), provides little or no performance improvement. In-line or backside level 2 caches have been implemented that improve performance substantially for the cases where good locality of reference exists. This approach uses a separate memory bus between the level 2 cache and the CPU that can operate level 2 caches at the speed of the CPU clock. With this approach, level 1 cache performance is the limiting factor and the limitations on level 1 cache halt further performance improvement. Increasing level 1 cache size to 1 MB or more would yield substantial performance improvement only in the cases where locality of reference exists. Increasing level 1 cache size is limited by two factors: a) the size of a CPU chip is limited in terms of the number of components that can be placed in an area due to heat dissipation and physical limitations and b) as memory size is increased, access time is increased exponentially. In all current systems, nothing has been done to provide good performance when CPU speed increases nor for cases where poor locality of reference exists.

What is needed is a cache memory architecture and design that 1) will provide at least the current level of memory subsystem performance at increased CPU speeds, 2) will provide larger level 1 caches while maintaining cache access times of one CPU clock cycle and 3) will provide a substantial performance improvement for executing an application or mix of applications that exhibit poor locality of reference. This invention provides all three needs in a simple and straight forward fashion through the concept and design of "cache windowing".

SUMMARY OF THE INVENTION

It is an object of the present invention to provide a higher performance internal computer cache memory architecture and design than currently exists with conventional microchip architectures.

It is a further object of the present invention to provide a cache memory system that implements "cache windowing."

It is a further object of the present invention to provide a cache memory system that can be applied with a variety of semiconductor fabrication technology and CPU performance.

It is a further object of the present invention to provide a cache memory that provides the CPU with data and instructions at rates which promote high CPU utilization rates at all CPU speeds, especially at speeds exceeding 300 MHz.

It is a further object of the present invention to provide a larger level 1 cache memory system that has a one CPU clock cycle access time.

It is a further object of the present invention to provide a cache memory system that provides high CPU utilization rates for processing those applications having low locality of memory references.

It is yet another object of the present invention to speed up the execution of applications performing operations over a computer network as well as networking applications executing while non networking applications are also executing on the same machine.

This invention, cache windowing, is a method of making a large cache memory, particularly level 1 cache, out of small cache windows to provide the speed advantages of a small cache while providing the performance benefits of a large cache. Cache windowing can also be applied at higher cache levels such as in level 2 and 3 cache memories.

DETAILED DESCRIPTION OF THE INVENTION

Figure 1:
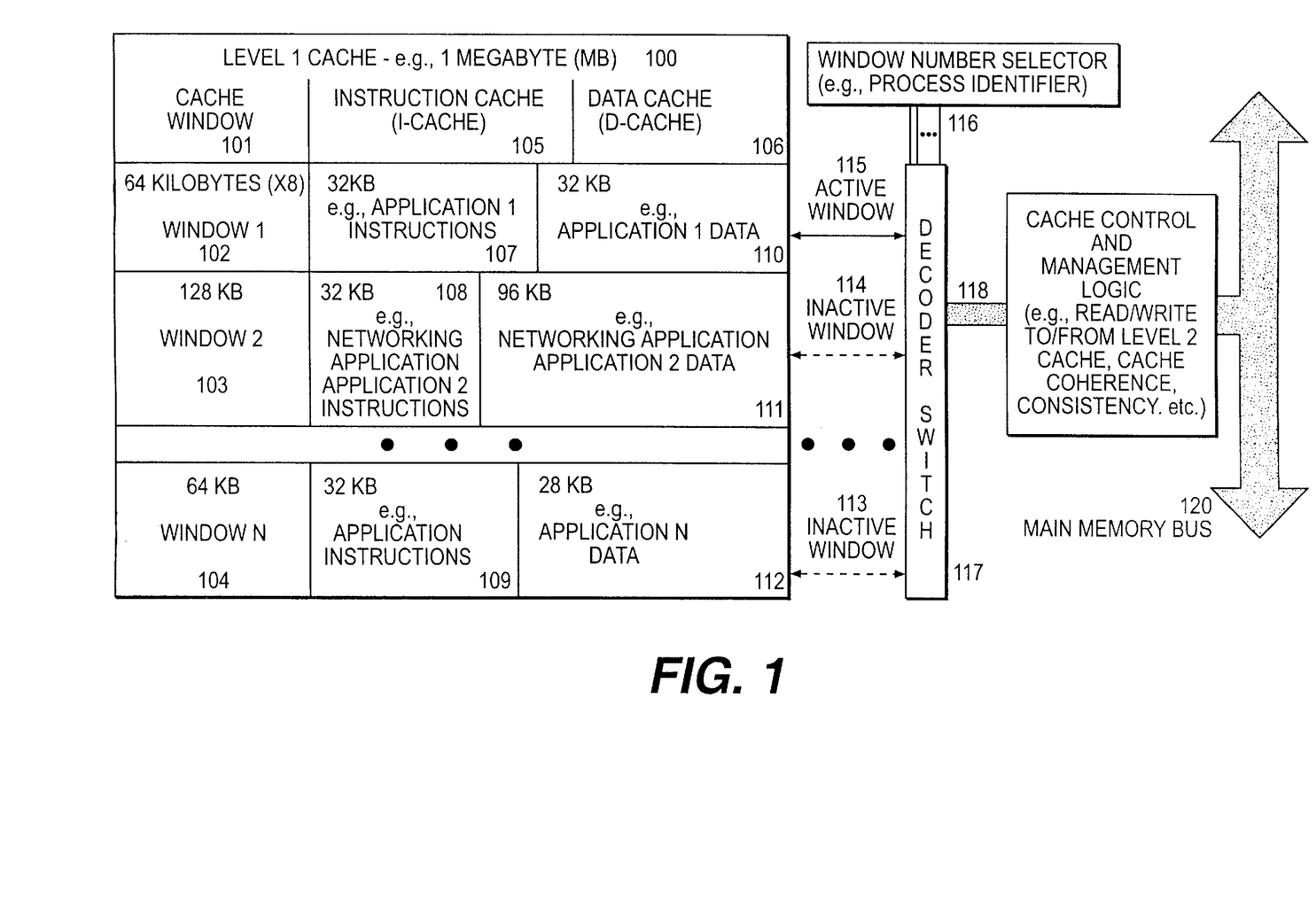
FIG. 1 shows how cache windows provide a large cache using a number of small segments (cache windows) thereby retaining the fast access times of a small cache while providing the benefits of a large cache and dedicated caches.

Referring to FIG. 1, an overview of the level 1 cache windowing concept and design is shown. Cache windowing makes a larger cache out of an increased number of smaller cache segments, retaining the fast access times of small caches while providing the benefits of a larger cache and dedicated caches with reduced semiconductor circuitry. The level 1 cache windowing concept can be applied to all levels of the memory subsystem, including level 2 and 3 cache memory, and even main memory—RAM. The level 1 cache 100 is composed of a number of physical cache memory pieces assigned singly or in combination as separately addressable cache windows 101–104. The size of the windows need not be of an equal number of cache lines, blocks or bytes. Each cache window is partitioned into two cache parts: 1) an instruction cache (I-Cache) 105 and 2) a data cache (D-Cache) 106. The size of the I-Cache and D-Cache parts of a cache window need not be of equal size. While not necessary for the functioning of the present invention, implementation is simplified if both the cache window sizes and the I-Cache and D-Cache partitions are set to the same values. Candidates for fixed value are 64 KB for the window size with 32 KB I-Cache and D-Cache partitions within the window. Each window is associated with a separate application program, process, or executable thread (collectively "executable entities") running on the machine and executed by the CPU. In FIG. 1, a non networking application such as a window manager is assigned to window 1 102 which has a size of 64 KB divided into 32 KB of I-Cache 107 and 32 KB of D-Cache 110. A networking application 108 such as a World Wide Web (WWW) browser is assigned to cache window 2 103 which has a size of 128 Kilobytes (KB) divided into a 32 KB I-Cache 108 and a 96 KB D-Cache 111. The final application process running on the CPU, application N, is assigned to the last window, window N 104 which has a size of 64 KB divided into 36 KB of I-Cache 109 and 28 KB of D-Cache 112. A window number is saved as part of the application processes state information.

When an executable entity returns to execution after being suspended, the window control and management logic 119 will select the correct cache window. Once selected, the cache will act as does current technology level 1 cache with associated policies and physical connections. All of the cache windows 102–104 sum up to the total size of the cache, in this case 1 MB.

As each executable entity gains control of the CPU to begin execution, the Window Number Selector 116 provides the address of the particular cache window assigned to that executable entity 116. The selected window then becomes the active window 115. Any number of methods may be used to provide the Window Number Selector 116. The application process identifier assigned by the Operating System (OS) may be used or the CPU register window selector may be used to double as the cache window number selector 116. Window number input can be provided via an application program interface (API) system call or system call argument, or by an application program message handler.

Once the cache window is identified and made the active window, the window decoder logic switch 117 connects the cache control and management logic 119 to the active window 115 via one set of connection logic and lines 118. The cache control and management logic 119 then connects the main memory bus 120 to the cache window for reading and writing instructions and data to the window in the course of normal operations.

When the executing entity is swapped out of the CPU for another executable entity to begin or resume executing, a new active window assigned to that executable entity is selected, e.g., 113 (window N 104) or 114 (window 2 103) and the same control and management logic 118 and 119 is connected to the new active window.

Figure 2:
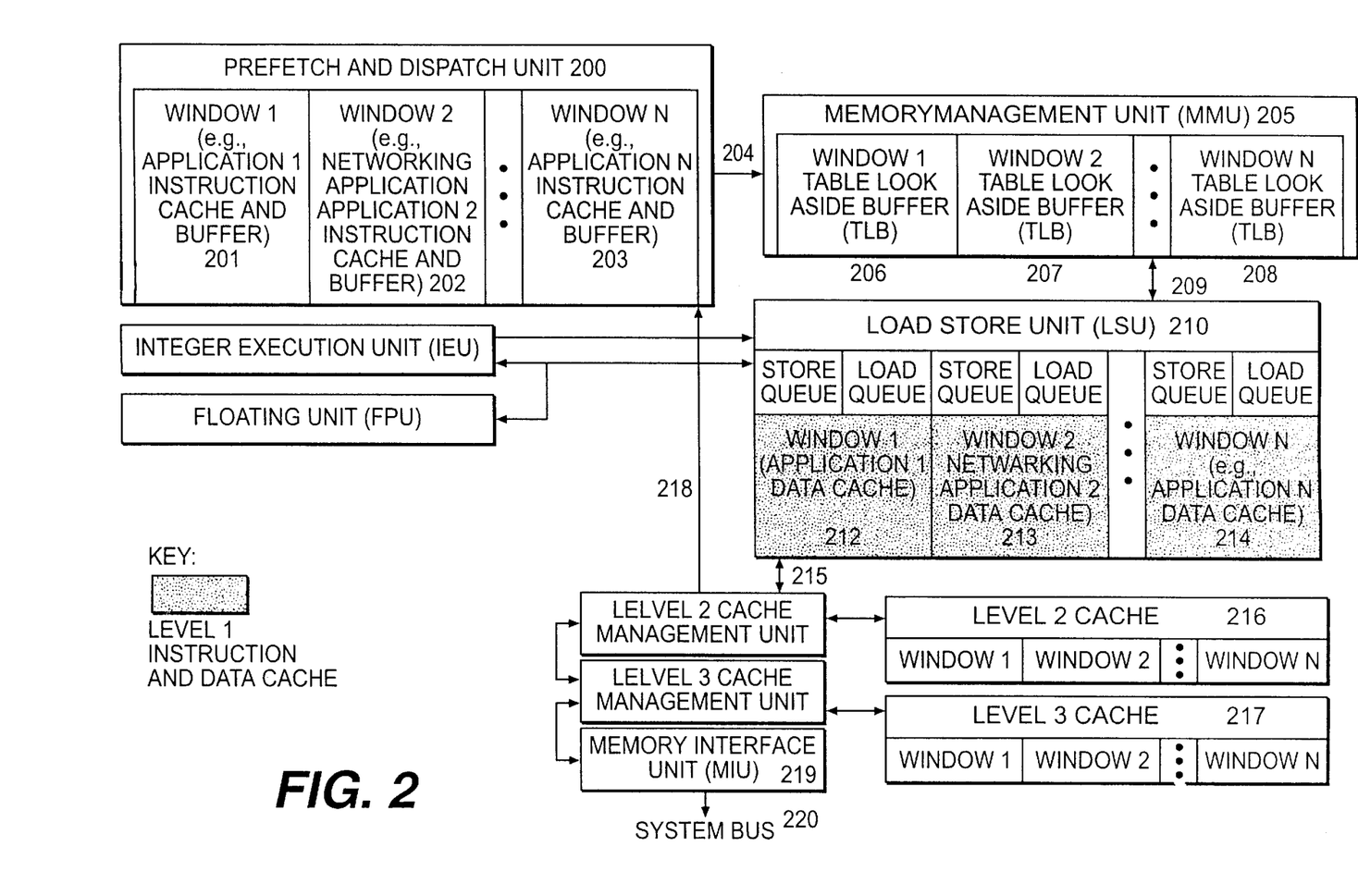
FIG. 2 shows how cache windows can be implemented with new cache/CPU designs.
Figure 3:
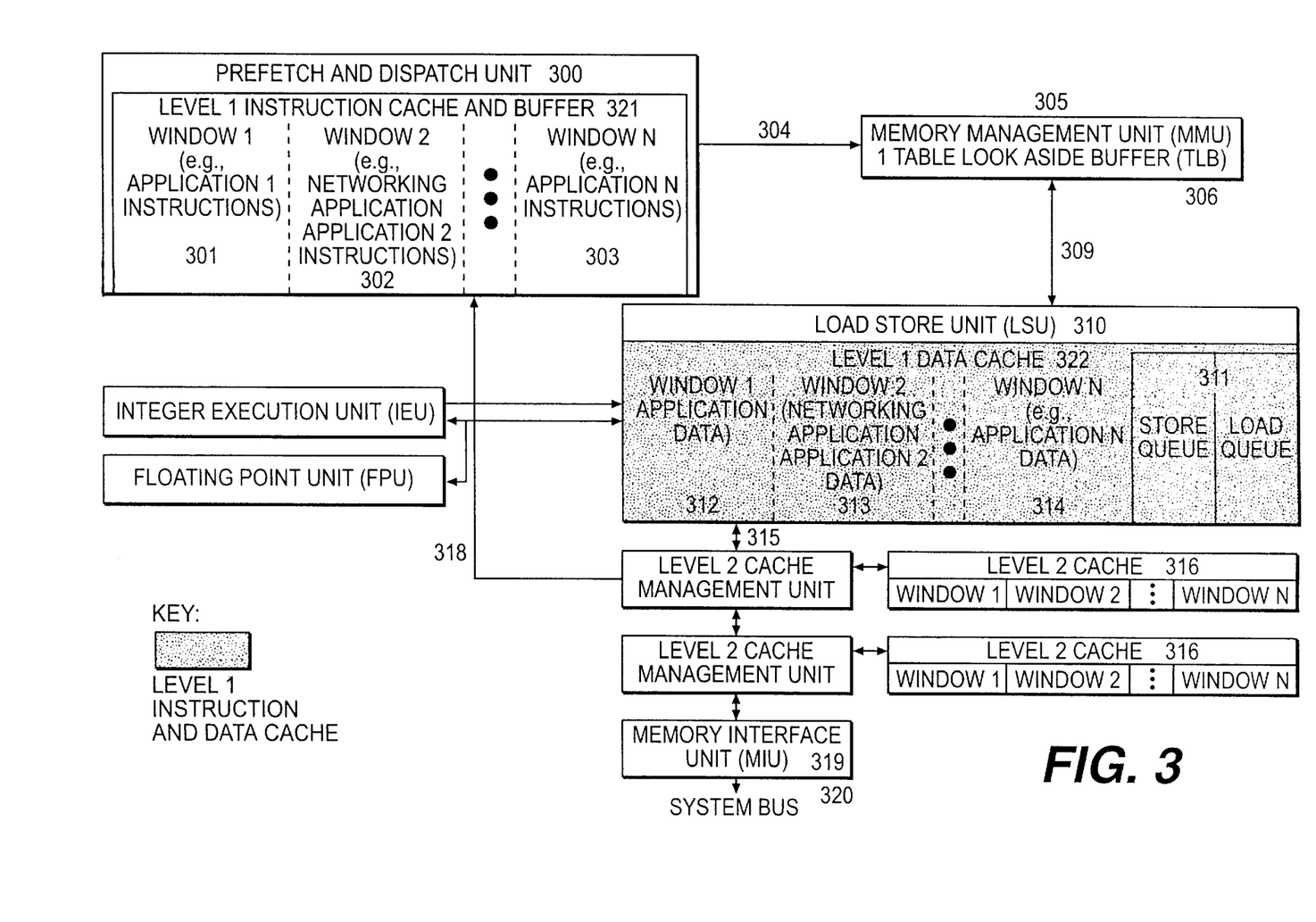
FIG. 3 shows how cache windows can be implemented with existing cache/CPU designs.

Referring to FIGS. 2 and 3, cache windows can be implemented a number of ways. Referring to FIG. 2, a generic CPU chip having additional (over the usual 32 to 64 KB of level 1 cache found in 1997 CPU chips) physical level 1 cache memory to implement cache windowing is shown. Cache windows can be implemented by adding more and new physical cache memory pieces in future CPU and cache designs. The prefetch and dispatch unit 200 contains an instruction and cache buffer for each window 201–203. The prefetch and dispatch unit 200 provides instructions 204 to a memory management unit (MMU) 205 which contains a table lookaside buffer (TLB) for each window 206–208. This reduces TLB misses and increases level 1 cache performance. The MMU 205 can contain less than one TLB per window, but must contain at least one TLB to match cache window content addresses. Instructions 209 from the MMU are sent to the Load Store Unit 210 where separate load and store queues 211 for each window D-Cache 212–214 access data from the window data caches 212–214. The level 2 cache supplies instructions 218 to the I-Cache partitions of the level 1 cache windows 201–203 and also supplies and receives data 215 from the D-Cache partitions of the level 1 cache windows 212–214. The Memory Interface Unit (MIU) 219 supplies access and control for all cache levels to receive instructions, and to receive and write data to and from main memory (RAM) 220. In this approach, large level 1 caches may be implemented which behave as small caches since only one window's worth of cache memory is active and accessed at a time. The window size will determine the speed of the cache, not the overall cache size.

Referring to FIG. 3, cache windowing is implemented as a minor modification to the existing CPU level 1 cache designs. Cache windows can be implemented using the existing CPU cache by dividing the existing cache into smaller virtual cache windows. In FIG. 3, the existing level 1 cache memory 321 and 322 of approximately 64 KB is divided into windows 301–303 and 312–314. Key differences between this implementation approach and that noted in FIG. 2 can be seen. The prefetch and dispatch unit 300 contains only one instruction and cache buffer for all windows 321, as in existing level 1 cache technology. The prefetch and dispatch unit 300 provides instructions 304 to a MMU 305 which contains only one TLB 306, the existing cache technology TLB 306, for all cache windows 301–303 and 312–314. Instructions 309 from the MMU are sent to the Load Store Unit 310 where a single load and store queue 311 for all window D-Caches 312–314 accesses data from the window data caches 312–314. The level 2 cache supplies instructions 318 to the I-Cache partitions of the level 1 cache windows 301–303 and also supplies and receives data 315 from the D-Cache partitions of the level 1 cache windows 312–314. The MIU 319 supplies access and control for all cache levels to receive instructions, and to receive and write data to and from main memory (RAM) 320. In this approach, a small level 1 cache is divided into smaller cache windows. The advantage of this approach over that depicted in FIG. 2 is that cache windows are implemented without the need for major CPU cache modifications. The drawback of this implementation of cache windows is that it results in a smaller cache for each application thereby limiting the number of windows that can be implemented and restricting cache performance.

Advantages

Cache windowing, as depicted in FIGS. 1–3, solves the shortcomings of present level 1 cache memory subsystems. Cache windowing maintains or improves CPU utilization rates as CPU speeds increase by supplying the CPU with more cached data at the fastest rate that the CPU can handle. By implementing a large level 1 cache, the CPU can consume data and instructions at a faster rate without waiting for cache memory contents to be updated. The CPU will be less likely to exhaust the cache contents before new data and instructions are available in the cache.

Cache windowing provides the additional data and instructions of a larger level 1 cache while maintaining the cache access times of small caches, one CPU clock cycle. Because only a window size worth of cache memory is ever active and accessed at one time, the inductive charge costs and path lengths are kept low enough to provide a one CPU clock cycle cache access time. By switching from one cache window to the next, the delay from loading cache with new instructions and data from either higher level caches or main memory are avoided, maintaining high CPU utilization rates at high CPU clock rates. While the CPU is working out of one cache window, the other cache windows can be loaded with the soon-to-be-needed instructions and data.

By allocating cache windows on an executable entity by executable entity basis, one executable entity does not compete with another for cache contents. One executable entity does not overwrite the cache contents of another executable entity, thereby greatly reducing or eliminating the CPU waiting for cache updates due to context switches and cache updating. In addition, by allocating larger cache windows to executable entities that have poor memory locality of reference, such as networking applications, the chances of finding the needed instructions or data in cache increase tremendously, reducing or eliminating CPUs wasting clock cycles waiting for cache memory to be updated with the needed instructions or data. Cache windowing can therefore be used to turn poor memory locality of reference into high cache hit ratios and hence faster CPU execution.

Mitigating the effects of poor memory locality of reference is one factor that makes cache windowing a candidate for all levels of cache memories, not just level 1 caches. In addition, cache windows could be adjusted to optimize cache hit ratios for the type of executable entity. For example, network applications process more data than the number of instructions they execute. A cache window with an 80% D-Cache and 20% I-Cache partition is possible providing higher cache hit ratios for applications which access more data than instructions.

Cache windowing can provide different executable entities with different cache sizes or even cache replacement policies. Windows of different sizes with different management policies could be allocated to different executable entities, or executable entities could be allocated a different number of fixed size windows. For example, some applications could be assigned several cache pieces to their respective cache windows. Cache windowing to achieve larger cache sizes requires less circuitry than non-windowing methods such as multiple associative cache sets. Because only a portion of the cache is accessed and active at one time, the cache window, the number of decoders, address lines, memory line connections and path lengths are reduced over other approaches. Once a cache window is selected, the cache and associated controlling management logic operates as a current Level 1 caches operate.

A CPU cache architecture has been shown having alternative embodiments of cache windowing illustrated through RISC implementation examples. Those skilled in the art will appreciate that other embodiments of the present invention will be possible without departing from the concept of the invention as disclosed.

RESULTS

Figure 4:
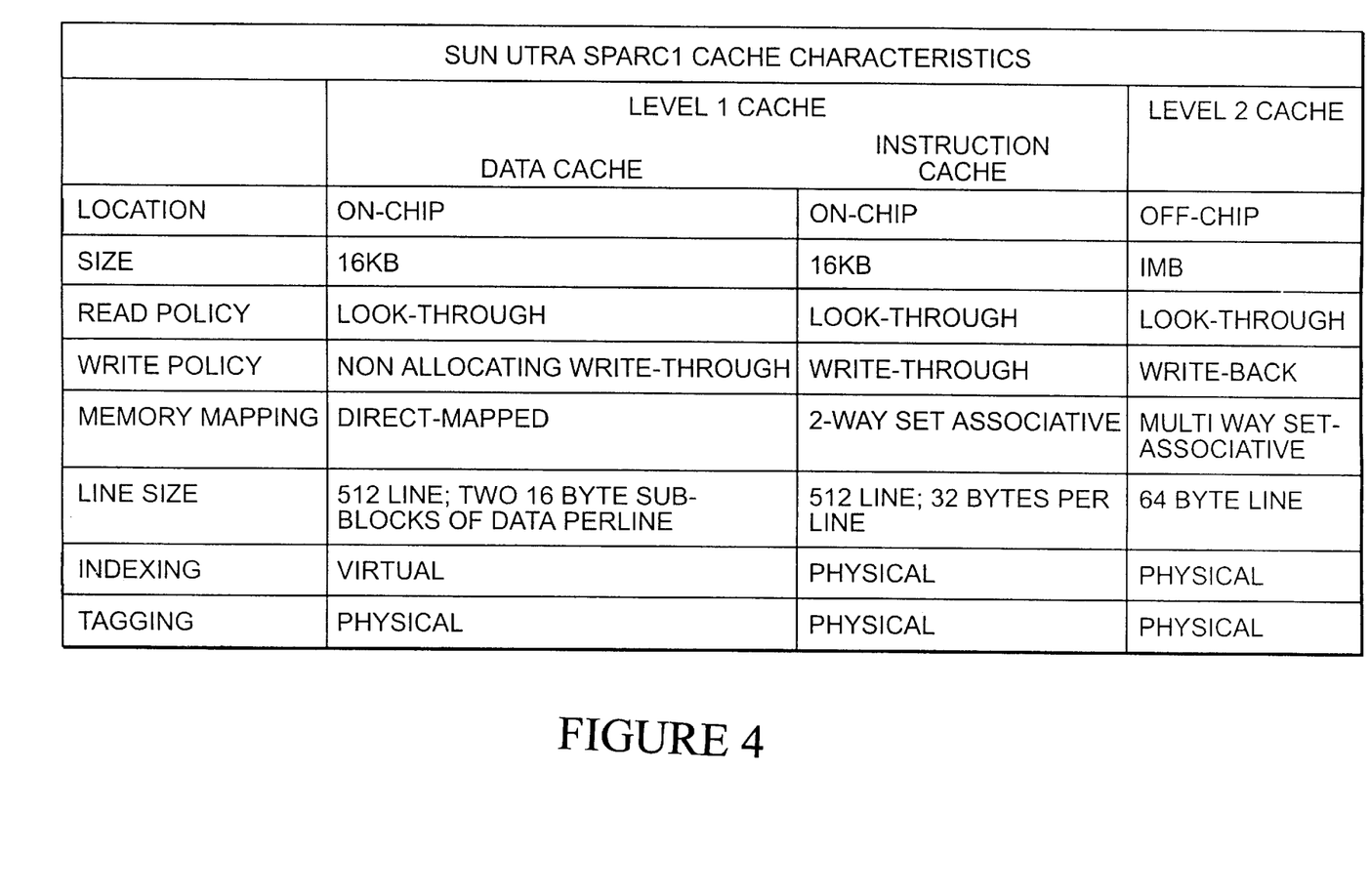
FIG. 4 shows the cache parameters used to simulate the performance improvement of cache windowing.
Figure 5:
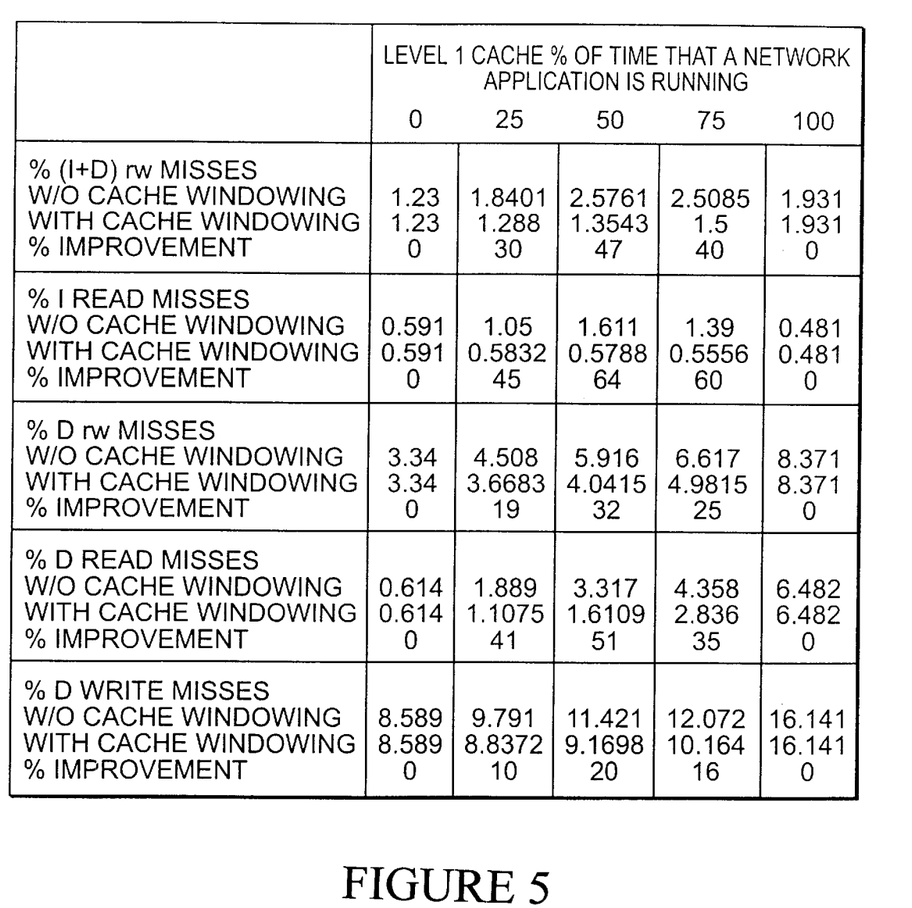
FIG. 5 lists the level 1 cache performance improvement simulation results.

Simulations were performed using a Commercial-Off-The-Shelf (COTS) cache simulator which simulates the level 1 cache operation of the current (1997) SUN Microsystems UltraSPARC1 CPU chip cache performance. For all experiments, the additional cache parameters used for the analysis tools are according to the current UltraSPARC1 microprocessor level 1 cache design and are summarized in FIG. 4. The overall performance of two cache windows versus a single unified level 1 cache that is shared between non networking and networking applications is depicted in FIG. 5. Using the 47% improvement for instruction and data read and write misses (I+D rw misses) from FIG. 5, yields an average performance improvement in CPU throughput of nearly 30%.

CPU throughput is governed by CPI, the number of clock cycles per instruction of application processing. CPI=iCPI+mCPI, where iCPI is the ideal cycles per instruction assuming a perfect memory system with no delays ever. mCPI is the number of memory cycles per CPI, or the number of clock cycles the CPU waits on the cache memory subsystem to have the needed instructions and or data in the level 1 cache. The value of iCPI is between 1.3 and 1.7, based on simulations and experimental trials with many processors. The mCPI is typically between 2.7 and 3.0 for any current high performance system. Using the values of 1.7 for iCPI and 3.0 for mCPI will yield the minimum improvement for a given reduction in mCPI. Using:

$$CPI_{current}=iCPI+mCPI_{current}$$

$$CPI_{new}=iCPI+mCPI_{new}$$

then $$CPI_{new}=1.7+(1-0.47)\times2.7=3.131$$

$$CPI_{current}=1.7+2.7=4.4$$

$$CPI_{new}/CPI_{current}=3.131/4.4=0.712=(1-0.712)\times100\%=28.8\%$$ improvement.

I claim:

1. A method for providing computer cache memory windowing using hardware partitioning comprising:
   providing a plurality of physical cache memory pieces associated with a CPU chip utilizing cache management and control logic;
   creating a plurality of cache windows made up of one or more of the physical cache memory pieces;
   by partitioning the plurality of physical cache memory pieces using the cache management and control logic
   assigning a different executable entity to each of the plurality of cache windows;
   saving a window number as part of the executable entity state information of each cache window;
   selecting a cache window based upon the window number; and
   making the selected cache window the active cache window.

2. The method for providing computer cache memory windowing of claim 1 wherein the cache is on the same computer chip with the CPU.

3. The method for providing computer cache memory windowing of claim 1 wherein the cache is located on a chip different from the CPU.

4. The method for providing computer cache memory windowing of claim 1 wherein the executable entities are taken from the group consisting of applications, processes and executable threads.

5. The method for providing computer cache memory windowing of claim 4 wherein the applications, processes and executable threads are networking applications, networking processes and networking executable threads.

6. The method for providing computer cache memory windowing of claim 4 wherein the applications, processes and executable threads are non-networking applications, processes and executable threads.

7. The method for providing computer cache memory windowing of claim 1 wherein each of the plurality of cache windows is of equal size.

8. The method for providing computer cache memory windowing of claim 1 wherein each of the plurality of cache windows is of a size different from the other cache windows.

9. The method for providing computer cache memory windowing of claims 2 or 3 wherein each of the cache windows comprises a separate physical cache.

10. The method for providing computer cache memory windowing of claim 1 wherein each of the plurality of cache windows is partitioned into at least two parts.

11. The method for providing computer cache memory windowing of claim 10 wherein the two cache parts are data cache and instruction cache.

12. The method for providing computer cache memory windowing of claim 11 wherein the data cache and instruction cache are of equal size.

13. The method for providing computer cache memory windowing of claim 11 wherein the instruction cache and the data cache are of a size different from one another.

14. The method for providing computer cache memory windowing of claim 5 wherein the network executable entity is a world wide web browser.

15. The method for providing computer cache memory windowing of claim 1 wherein the selecting of a cache window is based on an executable entity identifier.

16. The method for providing computer cache memory windowing of claim 4 wherein the selection of the cache window occurs based upon application program interface calls.

17. The method for providing computer cache memory windowing of claim 4 wherein the selection of the cache window occurs based upon system calls made by an executable entity.

18. The method for providing computer cache memory windowing of claim 1 wherein the selecting of a cache window is based upon CPU register window selection.

19. The method for providing computer cache memory windowing of claim 1 wherein the cache access time is one clock cycle of the CPU.

20. The method for providing computer cache memory windowing of claim 1 wherein the cache access time is more than one clock cycle of the CPU.

21. The method for providing computer cache memory windowing of claim 11 wherein the instruction cache partition of a cache window for an application comprises more than one cache memory piece from the plurality of physical cache memory pieces.

22. The method for providing computer cache memory windowing of claim 11 wherein the data cache for an executable entity comprises more than one cache window from the plurality of cache windows.

23. The method for providing computer cache memory windowing of claim 1 wherein the selecting of a cache window occurs using a single set of management and control logic.

24. The method for providing computer cache memory windowing of claim 1 wherein the management and control logic comprises a plurality of sets of management and control logic.

25. The method for providing computer cache memory windowing of claim 1 wherein only one cache window is active at any time.

26. The method for providing computer cache memory windowing of claim 1 wherein the plurality of cache memory pieces are located on a single unit.

27. The method for providing computer cache memory windowing of claim 26 wherein the single unit is selected from the group consisting of CPU units and cache memory units.

28. A method for providing computer cache memory windowing comprising:

provindg physical cache memory associated with a CPU chip;

utilizing hardware means for cache management and control logic;

creating a plurality of cache windows by partitioning the physical cache memory with the hardware means;

assigning a different executable entity to each of the plurality of cache windows based on executable entity state information;

saving a window number as part of the executable entity state information of each cache window;

selecting a cache window based upon the window number; and making the selected cache window the active cache window.

29. The method for providing computer cache memory windowing of claim 28 wherein the plurality of cache windows is created from partitioning the CPU cache.

30. The method for providing computer cache memory windowing of claim 28 wherein the plurality of cache windows is created by partitioning a single physical cache.

* * * * *